United States Patent Office 2,896,283
Patented July 28, 1959

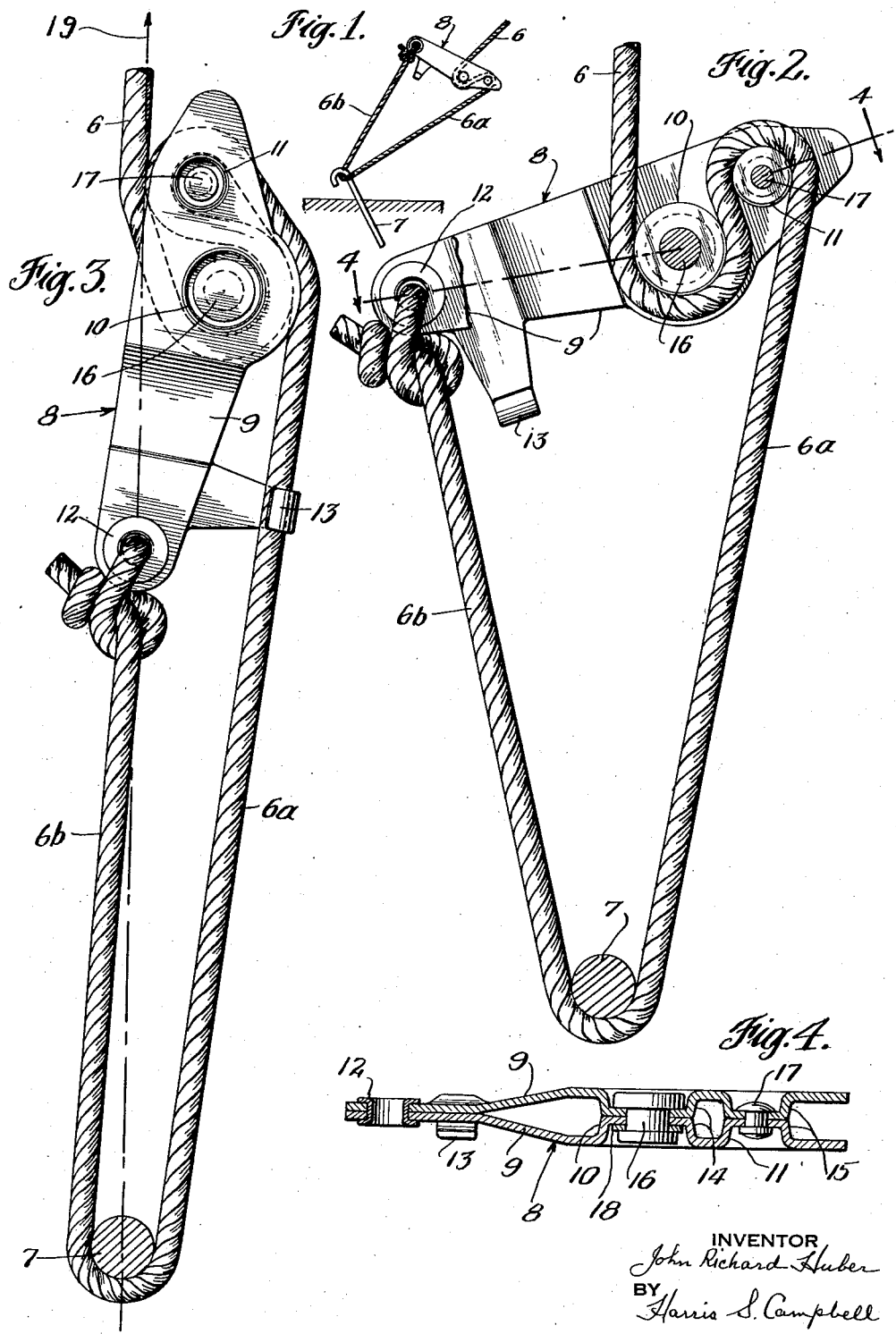

2,896,283

ROPE ADJUSTING AND SNUBBING DEVICE

John Richard Huber, Warrington, Pa., assignor to Eastern Rotorcraft Corporation, Doylestown, Pa., a corporation of Pennsylvania Application November 1, 1954, Serial No. 465,838

3 Claims. (Cl. 24—71.1)

This invention relates to rope adjusting and holding devices.

Rope tightener and snubbing devices for use with guy ropes and the like permit the effective shortening of a rope to take out the slack and secure it in the tightened position. Prior devices, while they provided for the tightening action and the prevention of slippage, were somewhat difficult to adjust because of the frictional action of the rope in passing through the device which usually produces sharp bends in the rope to provide for the snubbing action. The construction which provided the sharp bends and deformations in the rope further caused damage to the rope when high loads were applied to it. As a result, the rope fails in such devices at capacities considerable lower than the ultimate strength of the rope. Many of these devices cause breakage of the rope at values of fifty percent or less of the ultimate strength.

It is the primary purpose of the present invention to provide a tightening and snubbing device for use with rope which permits smooth and easy adjusting movement on the rope and which is constructed to prevent damage to the rope thereby permitting the transmission of substantially full tensile value of the rope.

An additional secondary object is the construction of a rope snubbing device as mentioned above which incorporates a special positioning clip to hold the snubber parallel to the rope after adjustment thereby increasing its holding capacity and preventing the possibility of accidental loosening in case of being struck by a passing object.

How the foregoing advantages of the present invention are accomplished will be clear from the following description of the drawings in which—

Figure 1 is a view showing the device of the present invention as applied to a guy rope.

Figure 2 is a plan view to an enlarged scale of the device in adjusted position having a side plate cut away to show the interior.

Figure 3 is a view similar to Figure 2 but showing the device in the final position for holding after adjustment has been accomplished.

Figure 4 is a sectional view taken along the line 4—4, Figure 2.

In the arrangement illustrated in Figure 1 the guy rope 6 is anchored to a stake 7 by means of a looped portion of the rope having lengths 6a and 6b. The snubber unit 8 provides the means for forming the looped portions 6a and 6b and for adjusting the overall length of this portion. Referring to the enlarged views, Figures 2, 3 and 4, it will be seen that the tightening device 8 incorporates a beam which is formed from two generally similar side plates identified by the numeral 9. Near the central portion of the beam, longitudinally considered, there is formed a drum 10 of relatively large diameter and toward one end of the beam a smaller drum 11 is formed. These drums provide for guiding rope 6 through the device in a fashion so that the main load carrying portion 6 enters the center of the beam and emerges from the opposite side of the beam near one end of the unit as indicated by rope portion 6a. After passing around stake 7 the other loop portion of the rope 6b is securely tied to the opposite end of the plates 9 which form the beam. From Figure 4 it will be seen that plates 9 at this end are brought together and metal grommet 12 is used to hold them riveted firmly in position. The hole through grommet 12 serves as a means by which the end of rope portion 6b is fastened to the unit 8. A clip 13 is formed on one of the side plates 9 to provide for holding the snubber unit in final position after adjustment.

Referring to Figure 4, it will be seen that drum 10 is formed by means of an inwardly dished projection 14 in each of the side plates 9. Similarly smaller drum 11 is formed by smaller diameter projections 15. By bringing the bottoms of the dished portions of each of the side plates together and fastening them by means of large rivet 16 and small rivet 17, the plates are held in rigidly assembled relationship and provide integrally formed smooth surface drums which permit passing the rope 6 through the device. A washer 18 is provided under large diameter rivet 16 in order to more fully distribute the load and maintain the parts in intimate assembled relationship.

To adjust the device the unit 8 is pulled away from the stake 7 along rope 6 to remove all slack and is then pulled hand tight. This is done with the parts in the relative positions illustrated in Figure 2. In the "open" position the parts once adjusted will transmit without slippage the full load applied to the rope 6. However, the unit 8 is liable to be bumped by a moving object with the possibility of accidental movement in a loosening direction. In order to place unit 8 in a secure and more compact position, it is swung around to the position shown in Figure 3, where it is substantially parallel to the direction of rope pull 19 in which position the portion of the rope 6a is retained in clip 13. In this position a greater length of travel around the drums is provided for the rope and at the same time portion 6a of the rope presses against portion 6 which passes around large drum 10, thus providing additional holding capacity against slippage. The proportioning of the unit provides that full load rope portion 6 is located approximately midway between the looped portions of the rope 6a and 6b. Thus when unit 8 is swung around to the position in Figure 3 no appreciable shortening or lengthening action takes place since the relative position of the drums 10 and 11 are selected to avoid such lengthening or shortening. Thus the tightness adjustment is not altered by swinging into the clipped position.

From the foregoing it will be seen that I have provided an improved rope snubbing device. The use of drums placed in the proper relative positions on the beam unit provides adequate holding capacity to prevent slippage of the rope after adjustment but gives a smooth drum surface which allows smooth and easy adjustment to the tightened position. The use of the dished construction for the side plates allows the formation of the drums as an integral part of the plate units. The clip formed on the end of the beam to which the rope is tied provides a simple method for holding the snubber in adjusted position with the least amount of projection so that it is out of the way once adjustment has been completed. The use of a relatively large drum in contact with the most highly loaded end of rope permits the transmission of substantially the full ultimate strength of the rope without damage. With this snubbing device, it is thus possible to use either smaller rope to do the work previously requiring a larger rope or to use the same rope to carry a greater load.

I claim:
1. A rope tightening and snubbing device in which a main load carrying rope extends from the central region on one side and an adjustable anchored loop portion extends from the ends of the device, said device incorporating a beam member composed of two side plate parts, a large diameter drum located between said plate parts adjacent the mid region of the beam member to locate the main rope load midway of said beam member, a smaller drum located between said plate parts at one end of said beam member to transfer the reduced load carried by one side of the loop portion of the rope, both of said drums incorporating coacting inwardly directed circular dished projections in said side plate parts, fastening rivets recessed in the external depressions of said dished projections to retain the plate parts in assembled relationship and a rope attachment terminal formed at the end of said beam opposite said smaller drum.

2. A rope tightener device in accordance with claim 7 in which one of said side plate parts incorporates an integrally formed clip located close to the end of said beam having said rope attachment terminal.

3. A rope tightening and snubbing device in which a main load carrying rope extends from the central region on one side and an adjustable anchored loop portion extends from the ends of the device, said device incorporating a beam member composed of two side plate parts, a large diameter drum located between said side plate parts adjacent the mid-region of the beam member to locate the main rope load midway of said beam member, a smaller drum located between said plate parts at one end of said beam member to transfer the reduced load carried by one side of the loop portion of the rope, both of said drums being rigidly attached to said side plate parts to prevent relative movement therebetween, a rope attachment terminal formed at the end of said beam opposite said smaller drum and a rope engaging clip attached to one of said side plate parts close to said rope attachment terminal, said clip being extended from the side of said beam at which the adjustable anchored loop is located and being positioned to engage the portion of the loop extending from the end of said beam carrying said smaller drum.

References Cited in the file of this patent

UNITED STATES PATENTS

| | | |
|---|---|---|
| 612,636 | Zusi | Oct. 18, 1898 |
| 625,453 | Martz | May 23, 1899 |
| 1,368,667 | Thorson | Feb. 15, 1921 |
| 1,422,804 | Witte | July 11, 1922 |
| 1,896,705 | Geisenhoner | Feb. 7, 1933 |
| 1,982,444 | Miller | Nov. 27, 1934 |
| 2,478,994 | White | Aug. 16, 1949 |
| 2,557,499 | Davis | June 19, 1951 |
| 2,571,592 | Lundstrom | Oct. 16, 1951 |

FOREIGN PATENTS

| | | |
|---|---|---|
| 173,709 | Switzerland | Dec. 15, 1934 |

UNITED STATES PATENT OFFICE

CERTIFICATE OF CORRECTION

Patent No. 2,896,283                          July 28, 1959

John Richard Huber

It is hereby certified that error appears in the printed specification of the above numbered patent requiring correction and that the said Letters Patent should read as corrected below.

Column 3, line 20, for claim reference numeral "7" read -- 1 --.

Signed and sealed this 29th day of March 1960.

(SEAL)
Attest:

KARL H. AXLINE
Attesting Officer

ROBERT C. WATSON
Commissioner of Patents